(12) United States Patent
Steil

(10) Patent No.: US 8,997,674 B1
(45) Date of Patent: Apr. 7, 2015

(54) PLUGHUG™ WATERCRAFT DRAIN PLUG HOLDER

(71) Applicant: Michael W. Steil, Saint Cloud, MN (US)

(72) Inventor: Michael W. Steil, Saint Cloud, MN (US)

( * ) Notice: Subject to any disclaimer, the term of this patent is extended or adjusted under 35 U.S.C. 154(b) by 109 days.

(21) Appl. No.: 13/681,407

(22) Filed: Nov. 19, 2012

(51) Int. Cl.
*B63B 13/00* (2006.01)
*B63B 17/00* (2006.01)
*B63C 3/00* (2006.01)

(52) U.S. Cl.
CPC .. *B63B 17/00* (2013.01); *B63C 3/00* (2013.01)

(58) Field of Classification Search
USPC .................................. 114/210, 197
IPC ...................................... B63B 13/00
See application file for complete search history.

(56) References Cited

U.S. PATENT DOCUMENTS

| 4,004,625 | A | * | 1/1977 | Zietlow, Jr. ..................... 383/40 |
| 4,516,515 | A | | 5/1985 | Johnson |
| 4,542,373 | A | | 9/1985 | Hillock |
| 4,843,376 | A | | 6/1989 | Wagner et al. |
| 5,047,753 | A | | 9/1991 | Birchfield |
| 5,110,020 | A | * | 5/1992 | Uhl .............................. 224/414 |
| 5,966,080 | A | | 10/1999 | Bigsby |
| 6,227,132 | B1 | | 5/2001 | Garcia |
| 7,152,546 | B2 | | 12/2006 | Bernath |
| 7,191,722 | B1 | | 3/2007 | Plost |
| 7,648,124 | B2 | | 1/2010 | Beers |
| 7,946,238 | B2 | | 5/2011 | Colsher et al. |
| 2004/0023574 | A1 | * | 2/2004 | Calkin ......................... 441/125 |
| 2007/0071366 | A1 | * | 3/2007 | Kao .............................. 383/38 |
| 2011/0018293 | A1 | * | 1/2011 | Escobar ....................... 294/140 |

* cited by examiner

*Primary Examiner* — Stephen Avila
(74) *Attorney, Agent, or Firm* — Albert W. Watkins

(57) ABSTRACT

A watercraft drain plug holder has a holder body defining a shell operative to receive and retain a watercraft drain plug therein. A coupler is affixed to the holder body and defines a perimeter and a hole inside the perimeter. The perimeter operatively passes through a boat hook eye or other similar boating component and around an eye circumference. The holder body passes through the coupler hole, thereby operatively wrapping around a boat hook eye and suspending the holder body from the eye. Several embodiments are shown, including a preferred version that incorporates resilient and non-marring materials and alternative solid and non-marring embodiments. In addition, several methods are described for storing a drain plug, launching a boat, and trailering a boat.

2 Claims, 3 Drawing Sheets

PLUGHUG™ WATERCRAFT DRAIN PLUG HOLDER

BACKGROUND OF THE INVENTION

1. Field of the Invention

The present invention pertains generally to ships and boats, and more particularly to an apparatus for safely stowing a boat plug when the plug is not stoppering the boat drain hole. A preferred method uses the apparatus with a boat winch hook to remind a boater to both remove and install the plug at appropriate times.

2. Description of the Related Art

Humans and water have been nearly inseparable since the beginning of time. While water is essential for survival, large bodies of water such as lakes and rivers are far more significant. Just the presence of a large body of water moderates temperature, making the summer cooler and the winter warmer. Water is also essential to all plant life, and the large body of water will have surrounding vegetation which is generally healthier and more prolific than would otherwise be possible without the body of water. Within the body of water will invariably be a number of aquatic species, many which may also provide food to humans. In addition to the essentials provided or facilitated by the large body of water, water also provides an excellent mode of transportation, both for commerce and for recreation. As can be appreciated then, large bodies of water have throughout history formed a place where humans have gathered and built dwellings and cities.

Throughout the ages, a large number of boats have been constructed to traverse bodies of water, including recreational boats and smaller utility boats. The vast majority of recreational boats and smaller utility boats hold a relatively limited number of people, commonly in the two to twenty range, or a corresponding weight in cargo. These boats are generally not fully enclosed or covered, and will have a certain amount of water that collects, either from waves or other splash, rain, or from wet cargo and people entering the boat. While the boat is in the water, many but not all boats provide a small pump referred to as a bilge pump that may be used to pump any water entering and accumulating back into the body of water. While the bilge pump is quite effective and generally very easy to use and maintain, the pump also requires a source of power. This power typically is provided from an on-board battery, which is in turn charged by a gasoline or diesel motor. The same battery that runs the bilge pump is also used to start the motor.

When the boat is removed from the water, additional water will commonly drain and accumulate in the bottom. This water will desirably be removed, to reduce dirt, to facilitate drying of the boat for storage, and also to avoid cross-contamination between different bodies of water. Over time, biologists have observed the cross-contamination of various bodies of water with various invasive species that can be quite harmful to the water ecosystem. By properly draining the boat, this cross-contamination can be reduced. Furthermore, uncovered boats will fill with rain and snow to a level which can damage electrical devices, lead to destructive mold and corrosion, and potential structural damage should the water freeze.

Unfortunately, a bilge pump does not fully drain a boat, and instead is limited to draining down to a small pool of water. Furthermore, running the pump undesirably drains the battery when the motor is not running. Since most watercraft motors are water cooled using the water that the boat is floating in, the motor cannot be run once the boat is removed from the water. Running the bilge pump would undesirably drain the very battery required to start the boat. During long periods of storage, the battery can easily be drained and water will again accumulate. As a result of these bilge pump limitations, most small boats are provided with a drain plug that may be removed to completely drain the boat.

An exemplary prior art boat plug 30 is illustrated in FIG. 1. This exemplary boat plug 30 has a T-handle 32 for manual grasping and manipulation. A body 36 that may, for exemplary purposes, comprise a rubber or other elastomeric compound is located between end washers 34 and 38, and about an at least partially threaded shaft 31. End washer 38 is internally threaded onto threaded shaft 31, while end washer 34 is preferably limited in travel so as not to be able to move towards T-handle 32 beyond a particular point along threaded shaft 31. In the preferred embodiment, this is accomplished by a small ridge or enlarged ring 33 formed on or affixed to threaded shaft 31. In use, washer 38 is inserted through a small hole in the boat, until the boat hull encompasses elastomeric body 36. To ensure a tight fit there between, the boater will rotate T-handle 32. Friction between the bat hull and body 36 will prevent body 36 from rotating. Similarly, friction between elastomeric body 36 and washer 38 will prevent washer 38 from rotating. This means that as T-handle 32 is rotated, washer 38 will be drawn towards end washer 34, effectively compressing body 36 and thereby causing body 36 to swell in diameter, creating an even tighter seal between body 36 and the boat hull. As might be appreciated, there are a variety of designs for prior art boat plugs, as well as different dimensions used.

Many states now require that a boat be transported with this plug removed to prevent the aforementioned cross-contamination. Unfortunately, the boat plug is relatively small and easily misplaced. Furthermore, it can easily be forgotten, especially when conditions are not good such as when the boat is being removed from the water during a rain storm or the like. Finally, in their eagerness to get out onto the water, many a boat owner has forgotten to install the plug, only to realize when the water level in boat becomes uncomfortable. In the worst case, if the boat is simply lowered into the water and then docked or moored and left unattended, the boat will sink without the boat plug installed.

In consideration of the need to regularly install and remove the boat plug, and the consequence of forgetting or misplacing the plug, a number of artisans have developed ways to store the plug. U.S. Pat. No. 6,227,132 by Garcia, entitled "Boat drain plug with cable tether"; U.S. Pat. No. 7,152,546 by Bernath, entitled "Boat drain plug system"; and U.S. Pat. No. 7,946,238 by Colsher et al, entitled "Ensuring installation of drain plug when launching aquatic vessel" are exemplary, the teachings and contents of each which are incorporated herein by reference. Each of these patents illustrate ways to couple a boat plug to a portion of a boat. While this greatly assists with misplacing or losing the boat plug, they do not provide any reminder to the boat operator to install or remove the plug, meaning one unfortunate forgetful moment could result in great damage to the boat or fines being assessed by government persons.

Other artisans have recognized the need to provide reminders of the boat plug status. Exemplary patents, the teachings and contents of each which are incorporated herein by reference, include U.S. Pat. No. 4,542,373 by Hillock, entitled "Small craft plug detector"; U.S. Pat. No. 4,843,376 by Wagner et al, entitled "Boat drain plug warning apparatus" U.S. Pat. No. 5,047,753 by Birchfield, entitled "Drain plug position indicator apparatus"; U.S. Pat. No. 5,966,080 by Bigsby, entitled "Drain plug warning system"; and U.S. Pat. No. 7,191,722 by Plost, entitled "Boat drain plug absence detector". While these patents illustrate the need for adequate reminder, they also provide such a reminder in a way that recurves undesirable complexity through electrical circuitry that adds complexity and presents another point of failure in a boat. Electrical systems that are present around water and the associated high humidity must be sealed to protect the electrical devices, and electrical connectors require precious metal plating to maintain electrical conductivity over time, both which add a great deal of expense. Further, several of these will also require alteration of the boat in order to be properly installed, which is also undesirable.

Two patents, U.S. Pat. No. 4,516,515 by Johnson, entitled "Boat plug reminder and method for use thereof" and U.S. Pat. No. 7,648,124 by Beers, entitled "Boat drain plug receptacle", the teachings and contents of each which are incorporated herein by reference, describe boat plug storage reminders that are cooperative with components used to load and transport the boat, which helps greatly in reminding a person of the need to either install or remove the boat plug from the boat. In the Beers patent, the boat plug is either installed in a custom hole in a custom winch handle, or installed in a hole in a bracket that is clamped to the winch handle by fasteners. This means that the winch handle must be replaced, or altered by the clamp which might undesirably mar the winch handle and lead to early corrosion. Further, the handle or clamp must be sized properly to fit with the particular boat plug, meaning a variety of clamps or winch handles must be stocked and sold to accommodate the needs of various users. In the Johnson patent, a chain terminated with a reminder flag is affixed to an anchor strap buckle. When the boat plug is removed for storage and transport, the boater will also stow the reminder flag. Unfortunately, this requires a chain that will bounce about and can mar the boat. The chain will also be prone to undesirable and unsightly corrosion.

In addition to the foregoing patents, Webster's New Universal Unabridged Dictionary, Second Edition copyright 1983, is also incorporated herein by reference in entirety for the definitions of words and terms used herein.

SUMMARY OF THE INVENTION

In a first manifestation, the invention is a watercraft drain plug holder. A holder body defines a shell operative to receive and retain a watercraft drain plug therein. A coupler is affixed to the holder body and defines a perimeter and a hole inside the perimeter. The perimeter is operatively passed through a boat hook eye and around a boat hook eye circumference and further permits the holder body to pass therethrough. The coupler thereby operatively wraps around a boat hook eye and suspends the holder body from the boat hook eye.

In a second manifestation, the invention is a method of installing a watercraft drain plug holder onto a boating component. According to the method, a portion of a coupler defining an opening is passed through an interior of an eye in a boating component. The coupler is wrapped around an exterior of the eye. A plug holder body is collapsed and inserted entirely through the coupler opening. The plug holder body is expanded subsequent to the inserting step, so that the plug holder body is of greater diameter than the coupler opening and will therefore not pass freely through the coupler opening.

In a third manifestation, the invention is a method of launching a boat. a portion of a coupler defining an opening is passed through an interior of an eye in a boating component. The coupler is wrapped around an exterior of the eye. A plug holder body is inserted entirely through the coupler opening subsequent to the passing and wrapping steps. A drain plug is stored in the plug holder body. A boat is transported upon a trailer. A boater approaches a boat winch and observes the watercraft drain plug holder responsive to the approaching step. A drain plug is removed from the watercraft drain plug holder responsive to observing. The drain plug is inserted into a boat drain before the boat is released from a boat trailer.

OBJECTS OF THE INVENTION

Exemplary embodiments of the present invention solve inadequacies of the prior art by providing a flexible storage pouch that may readily be attached to a boat winch cable hook or other suitable location. The pouch is operative to receive and secure a boat plug of indeterminate size while trailering the boat. The pouch is fabricated from a composition that is nonmarring to the watercraft and trailer, and is most desirably located in a place where the boater will be required to look when launching and trailering the boat.

A first object of the invention is to provide an intuitive and nonmarring storage apparatus for a boat plug. A second object of the invention is to accommodate and securely hold boat plugs of different sizes. Another object of the present invention is to accommodate a wide variety of boats and trailers, while still locating the drain plug holder in a place that will be viewed during boat launch and trailering. A further object of the invention is to provide a low cost, corrosion resistant and easily fabricated drain plug holder.

BRIEF DESCRIPTION OF THE DRAWINGS

The foregoing and other objects, advantages, and novel features of the present invention can be understood and appreciated by reference to the following detailed description of the invention, taken in conjunction with the accompanying drawings, in which.

DESCRIPTION OF THE PREFERRED EMBODIMENT

Manifested in the preferred embodiment watercraft drain plug holder 10 illustrated in FIGS. 2-5, the present invention provides watercraft boat plug storage while trailering, a visual reminder prior to trailering that the boat plug needs removed from the boat and stored, and a visual reminder prior to launch that the boat plug has not been installed on the boat. Watercraft drain plug holder 10 has a coupler 20 that is designed to operatively affix watercraft drain plug holder 10 to any suitable location on a watercraft.

Figure 1:
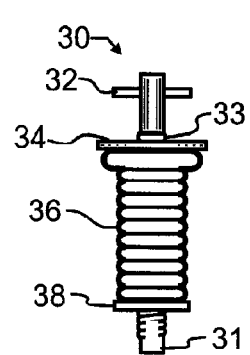
FIG. 1 illustrates a prior art boat plug from a front elevational view.
Figure 2:
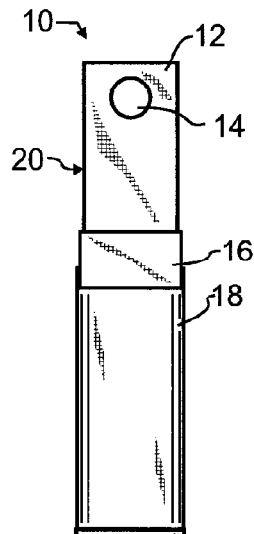
FIG. 2 illustrates a preferred embodiment watercraft drain plug holder from a front elevational view with a drain plug enclosing flap in a closed position.
Figure 3:
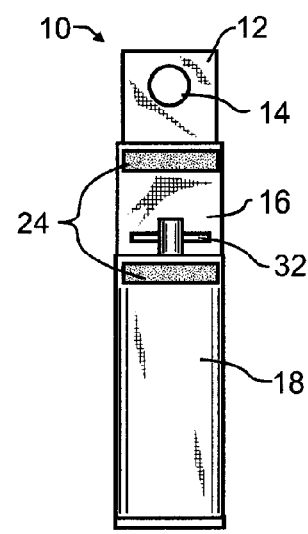
FIG. 3 illustrates the preferred embodiment watercraft drain plug holder of FIG. 2 from a front elevational view with a drain plug enclosing flap in an open position revealing the T-handle 32 of boat plug 30.
Figure 4:
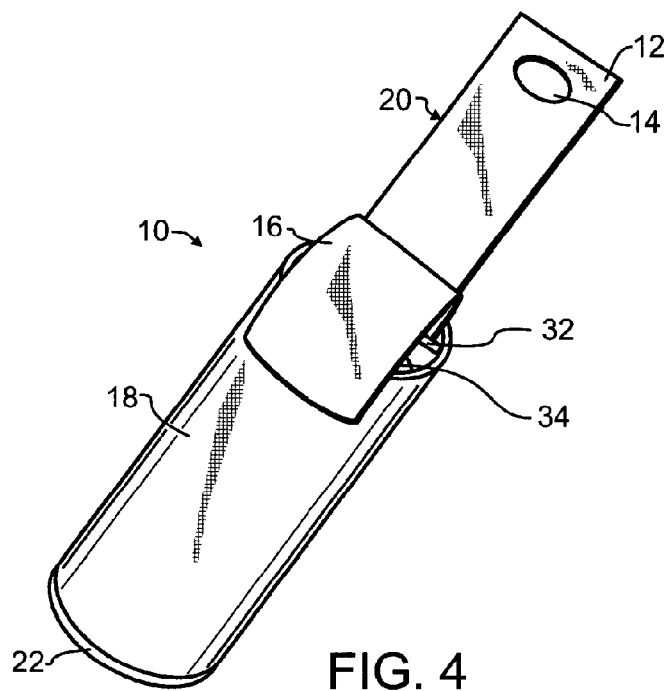
FIG. 4 illustrates the preferred embodiment watercraft drain plug holder of FIG. 2 from a projected view.

While the structure of coupler 20 is not critical to the present invention, and so may comprise any suitable structure for affixing to various locations on the boat or trailer, preferred embodiment coupler 20 has an elongate tongue 12 with a hole 14 formed there through. Coupler 20 is fabricated from a sheet or web of highly elastic or resilient material. In the relaxed state illustrated in FIGS. 2-4, hole 14 is substantially smaller in diameter than the outer diameter of holder body 18. Holder body 18 is preferably also fabricated from a highly elastic or resilient material, and may be fabricated from the same material as that used to fabricate elongate tongue 12. If holder body 18 is elastic or resilient, then elongate tongue 12 only needs to be sufficiently elastic to allow hole 14 to expand around an empty and collapsed holder body 18. This will preferably require some expansion of hole 14, which helps to ensure that watercraft drain plug holder 10 stays affixed where put, unless or until intentionally removed therefrom. In this preferred embodiment, holder body 12 is sufficiently resilient to stretch around drain plug 30 and secure drain plug 30 elastically. In this preferred embodiment watercraft drain plug holder 10 with drain plug 30 inserted within holder body 18 as illustrated in FIGS. 3 and 4, holder body 18 is no longer collapsible and will assume a largest diameter slightly greater than the largest diameter of drain plug 30. If hole 14 is not sufficiently elastic to expand to this holder body 18 largest diameter, then the insertion of drain plug 30 into holder body 18 essentially locks watercraft drain plug holder 10 into place through coupler 20.

While optional and not essential to the proper working of the present invention, a cover flap 16 may be provided and may further be provided with one or more fasteners, such as Velcro™ or equivalent hook and loop fasteners 24 visible in FIG. 3. Also optional and not essential to the proper working of the present invention is bottom 22, which serves to enclose holder body 18 at an end distal to cover flap 16. Particularly where cover flap 16 and bottom 22 are provided, holder body 18 in an alternative embodiment may be less resilient or even rigid. In this alternative embodiment where holder body 18 is more rigid, then hole 14 must be sufficiently resilient to expand to a diameter equal to or greater than the outer diameter of holder body 18.

Figure 5:
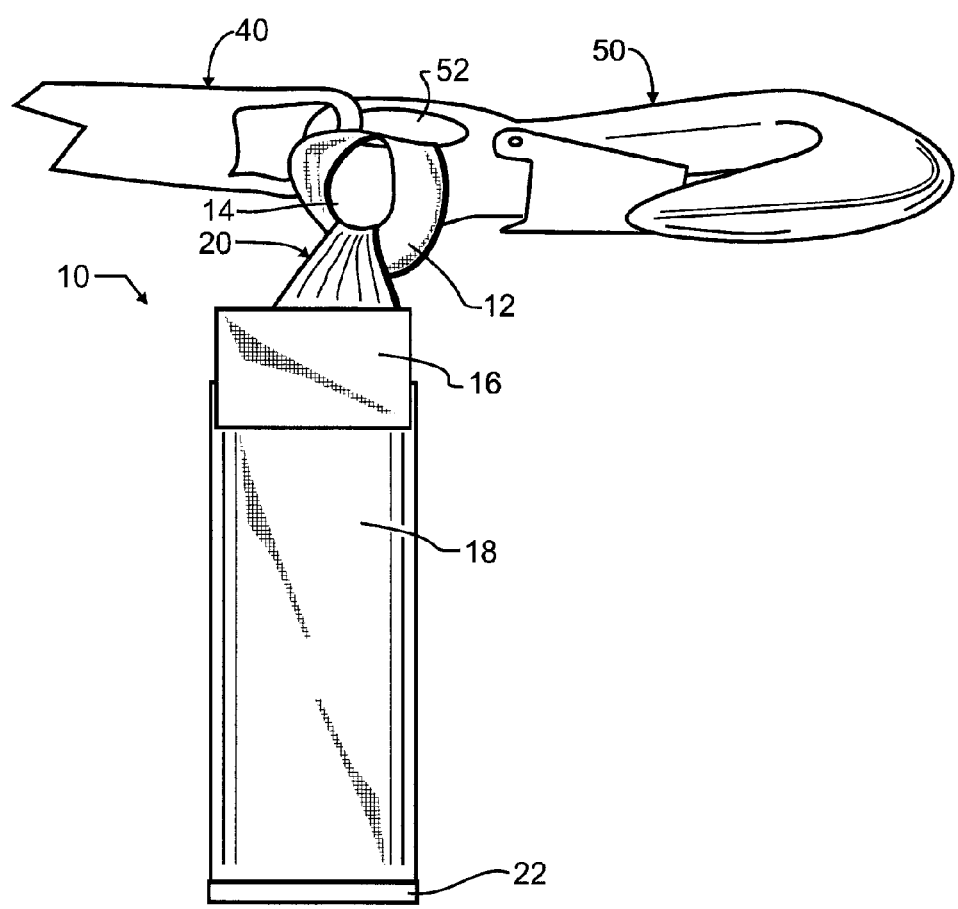
FIG. 5 illustrates the preferred embodiment watercraft drain plug holder of FIG. 2 from a front elevational view in a further preferred combination with a trailer boat hook.

As FIG. 5 illustrates, coupler 20 is used in accord with a preferred method described in greater detail herein below to couple to a prior art boat hook 50, preferably through eye 52 that also couples boat hook 50 to prior art winch strap or cable 40. Most preferably, holder body 18 in a relaxed state will assume the cylindrical shape as illustrated. Consequently, even without drain plug 30 inserted therein, holder body 18 will form a discontinuous top surface that resists passage through hole 14. Should there be sufficient force to start to draw holder body 18 through hole 14, then there will also be significant friction between hole 14 and holder body 18, which will tend to impede holder body 18 from passing back through hole 14 and hereby releasing from boat hook 50. Nevertheless, a person may readily remove watercraft drain plug holder 10 from boat hook 50, should the person intend to do so, just as they may also intentionally affix watercraft drain plug holder 10 to boat hook.

Many materials may be used in the fabrication of watercraft drain plug holder 10 and alternative embodiments thereof in accord with the teachings of the present invention, including but not limited to various metals, plastics, rubber and elastomeric compounds, woven and non-woven fabrics, and even laminates or composites thereof. However, in accord with the teachings of the preferred embodiment, a soft and resilient material such as fabric-faced neoprene rubber as is commonly used in the wet suit industry is most preferred. Most preferably, the core is neoprene rubber or other similar compliant but yet also shape-sustaining material, while both surfaces of the core are covered or laminated with a resilient material such as Spandex or Lycra-nylon fabric. This material selection ensures good resilience, while also ensuring sufficient strength and rigidity to form the desired construction contours. In addition, this material is extremely soft and conformal, which means that it will not damage adjacent boat or winch components, and instead will cushion and conform about a boat plug inserted therein. In addition, and owing to this same resilience, the boat plug may be of different sizes, since this material can stretch significantly to accommodate and contain boat plugs having a wide range of dimensions.

A preferred method of installing the preferred embodiment watercraft drain plug holder 10 and alternative embodiments thereof comprises a step of passing a portion of coupler 20 including hole 14 through an interior of eye 52 in boat hook 50. Holder body 18 is next collapsed and passed around an exterior of hole 52, and is then passed through hole 14 to thereby wrap coupler 20 about eye 52. Holder body 18 is then expanded and hole 14 contracted, so that holder body 18 is of greater diameter than hole 14 and will therefore not pass freely through hole 14.

A preferred method of trailering a boat in accord with the teachings of the present invention comprises a step of pulling boat hook 50 and thereby unspooling winch strap 40 from a winch. Boat hook 50 will be clipped to the boat, and the winch will be turned, thereby pulling the boat onto the trailer, as is known in the prior art. Then the boater will remove boat hook 50 from the boat, and in the process will observe watercraft drain plug holder 10. If not already done, responsive thereto the boater will remove drain plug 30 from the boat drain hole. Drain plug 30 is then slipped into watercraft drain plug holder 10, and, if available, optional cover flap 16 may be closed by affixing fasteners 24 together.

A preferred method of launching a boat in accord with the teachings of the present invention comprises a step of approaching a winch and responsive thereto observing watercraft drain plug holder 10. If not already done, responsive thereto the boater will remove drain plug 30 from watercraft drain plug holder 10 and insert drain plug 30 into the boat drain hole. The winch will be turned, thereby releasing the boat from the trailer, as is known in the prior art. Then the boater will remove boat hook 50 from the boat, allowing the boat to launch and float upon the water.

Figure 6:
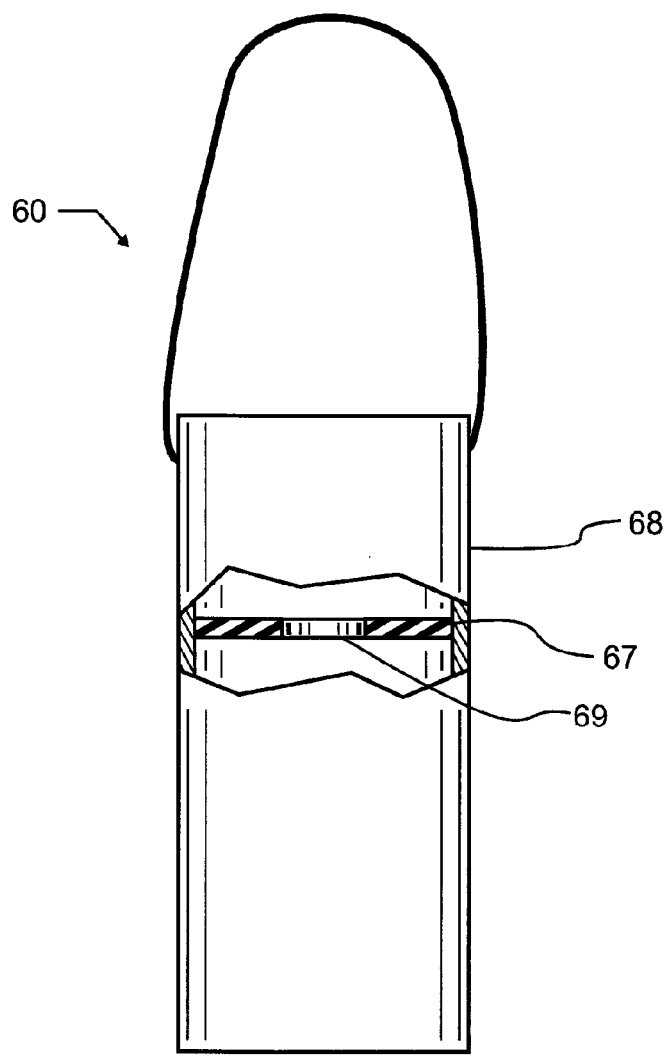
FIG. 6 illustrates an alternative embodiment watercraft drain plug holder from a front elevational and partial sectional view.

A first alternative embodiment watercraft drain plug holder 60 is illustrated in FIG. 6. Watercraft drain plug holder 60 has a coupler 70 that as illustrated may, for exemplary purposes only and not limiting thereto, be a resilient or elastic cord. Where coupler 70 is elastic, coupler 70 may be relatively short. This ensures that, when coupler 70 is attached through eye 52, the elasticity inherent in coupler 70 will ensure there is not sufficient space for holder body 68 to passing back through and release from eye 52. In a further contemplated alternative embodiment, coupler 70 may be a relatively flaccid cable such as a stainless steel or plastic wire. In this case, coupler 70 will need to be elongated from that illustrated in FIG. 6, since coupler 70 must be sufficiently long to wrap about eye 52 and still have enough length to permit holder body 68 to also pass through.

Watercraft drain plug holder 60 has a relatively rigid holder body 68 that may, for exemplary purposes and not solely limited thereto, be fabricated from a molded plastic. This plastic may be significantly more rigid than the wet suit material preferred for watercraft drain plug holder 10. As a result, holder body 68 may not have enough intrinsic resilience to stretch about and hold drain plug 30. Consequently, a cover such as cover 16 will preferably be provided to retain drain plug 30 therein.

In addition to or alternatively to providing a cover similar to cover 16, a washer 67 may optionally be formed internally within holder body 68 having an internal hole 69 passing there through. End washer 38 may then pass through hole 69, while body 36 will preferably engage with washer 67, just as it does with a boat hull. Washer 67 optionally may be formed of a more resilient material, or alternatively may be formed relatively thinner than holder body 68 to permit greater flexure. With appropriate consideration, drain plug 30 may be secured therein. In this alternative embodiment watercraft drain plug holder 60, holder body 68 will still preferably be formed from a plastic or other relatively softer and non-marring material to protect adjacent apparatus from damage.

While the foregoing details what is felt to be the preferred embodiment of the invention, no material limitations to the scope of the claimed invention are intended. Further, features and design alternatives that would be obvious to one of ordinary skill in the art are considered to be incorporated herein. The scope of the invention is set forth and particularly described in the claims hereinbelow.

I claim:

1. A method of installing a watercraft drain plug holder onto a boating component, comprising the steps of:
   passing a portion of a coupler defining an opening through an interior of an eye in said boating component;
   collapsing a plug holder body;
   wrapping said coupler around an exterior of said eye;
   inserting said collapsed plug holder body entirely through said coupler opening; and
   expanding said plug holder body subsequent to said inserting step, so that said plug holder body is of greater diameter than said coupler opening and will therefore not pass freely through said coupler opening.

2. The method of installing a watercraft drain plug holder onto a boating component of claim 1, further comprising the steps of:
   enlarging said coupler opening prior to said passing step; and
   shrinking said coupler opening subsequent to said passing step.

\* \* \* \* \*